United States Patent Office 3,200,488
Patented Aug. 17, 1965

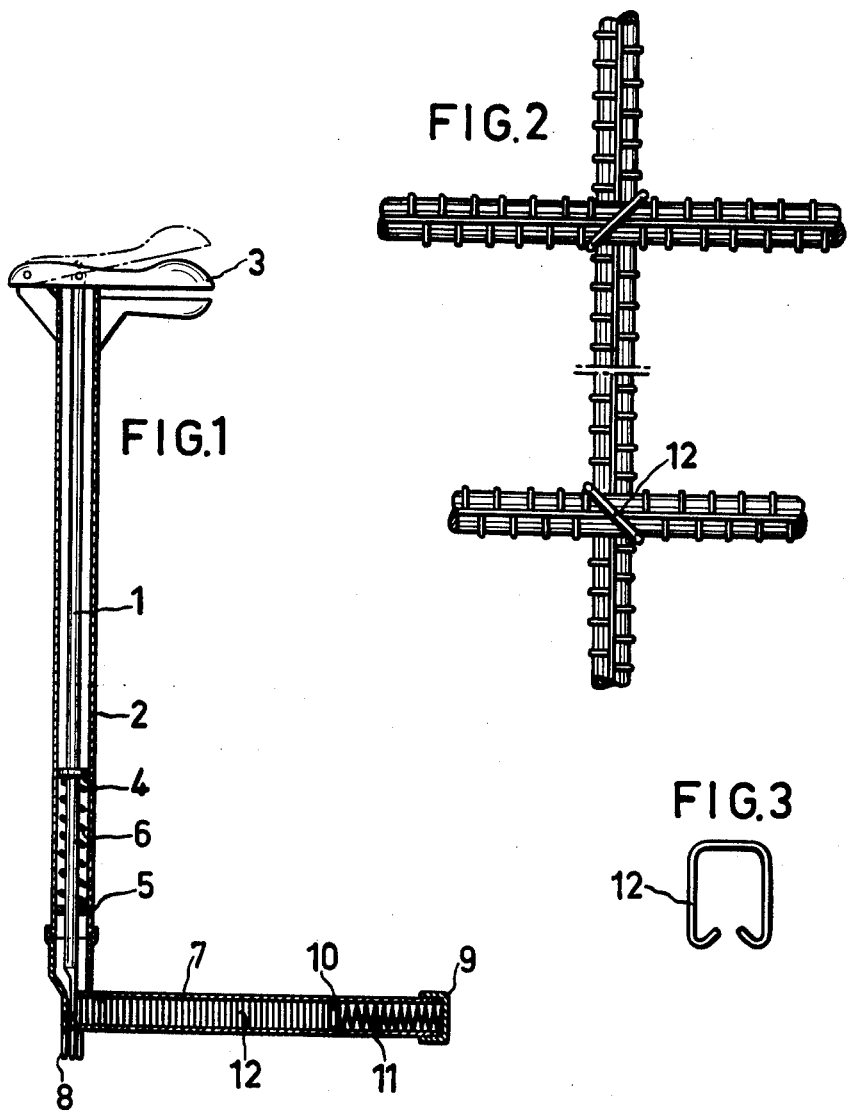

3,200,488
METHOD FOR JOINING REINFORCING RODS AND TOOL FOR CARRYING OUT THE METHOD
Kurt Erland Alfred Johansson, Allegatan 13, Hyltebruk, Sweden
Filed Mar. 29, 1963, Ser. No. 269,107
3 Claims. (Cl. 29—453)

This invention relates to a method for joining iron reinforcing rods which cross by means of prefabricated clamps and to a tool for carrying out the method.

According to methods hitherto used reinforcing rods for building purposes are, as a rule, joined manually. This must be carried out by the workman in a crouching posture and thus especially the back and the legs are subjected to very great strain. The hands often become sore by the contact with reinforcing rods and wire ends. The work is, as a rule, carried out with unprotected hands even if it is carried out in cold or other unsuitable weather. The work is considered heavy and trying. Moreover, it takes a rather long time, thus involving increased labor costs.

The above drawbacks have been completely eliminated by the method of joining reinforcing rods according to the present invention.

In order to carry out the method, prefabricated clamps are used which are applied by a tool which comprises few movable elements and therefore is very reliable in operation, durable, inexpensive and easy to manipulate. The clamp used for holding the reinforcing rods together is preferably made of flexible material. The method according to the invention is time saving and thus very much reduces the labor costs.

The method according to the invention is characterized in that a clamp magazine containing clamps of a size suitable for the reinforcing rods to be joined and being provided with a nozzle is placed with said nozzle against one of the crossed reinforcing rods to be joined, whereafter a clamp is, by means of a push rod, pushed out from the clamp magazine to surround the reinforcing irons.

The tool for carrying out the method comprises a push rod mounted in an elongated casing and being displaceable axially in the casing against spring action by a push handle pivotally connected to one end of the push rod and to the adjacent end of the casing, and a clamp magazine exchangeably connected to the other end of the casing and extending generally at right angles thereto, the magazine having a clamp discharge nozzle at one end registering with the casing and into which the push rod projects upon manipulation of the handle to individually eject clamps from the magazine.

The method and apparatus according to the invention will be described in detail hereinafter with reference to the accompanying drawing, wherein:

FIG. 1 is a vertical sectional view of a tool for applying clamps to crossed reinforcing rods according to this invention;

FIG. 2 is a plan view of crossed reinforcing rods joined by clamps in accordance with this invention; and FIG. 3 is an elevational view of one of the clamps.

The tool comprises a push rod 1 mounted in a casing 2. A push handle 3 is pivotally connected to one end of the casing and to the push rod. A helical spring 6 is placed around the push rod between two shoulders 4 and 5. To the other end of the casing there is connected a clamp magazine 7 which is exchangeable. The clamp magazine is at one end provided with a nozzle 8 through which the clamps provided in the clamp magazine can be pushed out, one at a time by means of the push rod. The clamp magazine is at the other end provided with a detachable cap 9. A plunger 10 in the magazine is, by means of a helical spring 11, pushed against the row of clamps 12 in the magazine.

As shown on FIG. 3, each clamp 12 is generally U-shaped and has sides connected at one end and formed with inwardly bent free ends which are reverted so as to converge toward the connected end of the sides.

When reinforcing rods crossing one another are to be joined, the tool is placed with the nozzle against one of the rods and extending diagonally relative to the axes of the rods at the crossing point. The handle is pushed down whereby a clamp is pushed out through the nozzle against one of the rods which engages the converging reverted free ends of the sides of the clamp to spread the latter and permit the clamp to embrace both rods at the crossing. When the handle is released, the push rod returns, thanks to the helical spring 6, to an upper position, and the helical spring 11 in the clamp magazine pushes a new clamp underneath the push rod. The tool is then again ready for use.

What I claim is:

1. A tool for installing generally U-shaped clamps to join crossing reinforcing rods, said tool comprising an elongated casing which is substantially upright in the position of use of the tool, a push rod extending longitudinally in said casing and being axially movable relative to the latter, spring means in said casing urging said push rod upwardly relative to the casing, a push handle pivotally connected to a handle grip support secured around the upper end of said elongated casing and connected to said push rod to move the latter toward the lower end of the casing against said spring means upon manipulation of the handle, and a clamp magazine exchangeably connected to said lower end of the casing and extending generally at right angles to the axis of the casing, said magazine having a clamp discharge nozzle at one end registering with said casing and into which said push rod extends upon manipulation of the handle to individually eject clamps downwardly from the magazine.

2. A tool as in claim 1; wherein said magazine further has a removable cap at the other end, a plunger slidable in said magazine and a spring between said cap and plunger to cause the latter to displace clamps in the magazine toward said nozzle.

3. A method for joining right-angularly extending reinforcing rods at the crossings of said rods, comprising preforming resilient, generally U-shaped clamps each having sides connected at one end and formed with inwardly bent free ends which are reverted so as to converge in the direction toward said one end, and, at each crossing of the rods, driving one of said clamps against one of the rods with said sides of the clamp lying in a plane diagonal with respect to the axes of the rods to be joined and with said converging reverted free ends of the clamp being engaged by the rod so as to be resiliently spread by the latter and thereby permit embracing of both rods at said crossing.

References Cited by the Examiner
UNITED STATES PATENTS

| | | | |
|---|---|---|---|
| 822,994 | 6/06 | Shuflin | 287—49 |
| 1,222,149 | 4/17 | Shafer | 1—3 |
| 1,962,874 | 6/34 | Polzer | 1—3 |
| 2,142,438 | 1/39 | Faiveley | 29—453 |
| 2,284,222 | 5/42 | Miller | 29—453 |
| 2,545,372 | 3/51 | Morberg | 1—49 |
| 2,699,549 | 1/55 | Steiner | 1—3 |
| 3,017,205 | 1/62 | Williams | 287—49 |
| 3,040,419 | 6/62 | Erdmann | 29—212 |
| 3,100,334 | 8/63 | Ramseier | 29—212 |

WHITMORE A. WILTZ, *Primary Examiner.*
THOMAS H. EAGER, *Examiner.*